Oct. 7, 1952  C. D. BARRETT  2,613,075
BOLSTER SPRING AND SNUBBER MEANS FOR RAILWAY CAR TRUCKS
Filed April 21, 1949  3 Sheets-Sheet 1
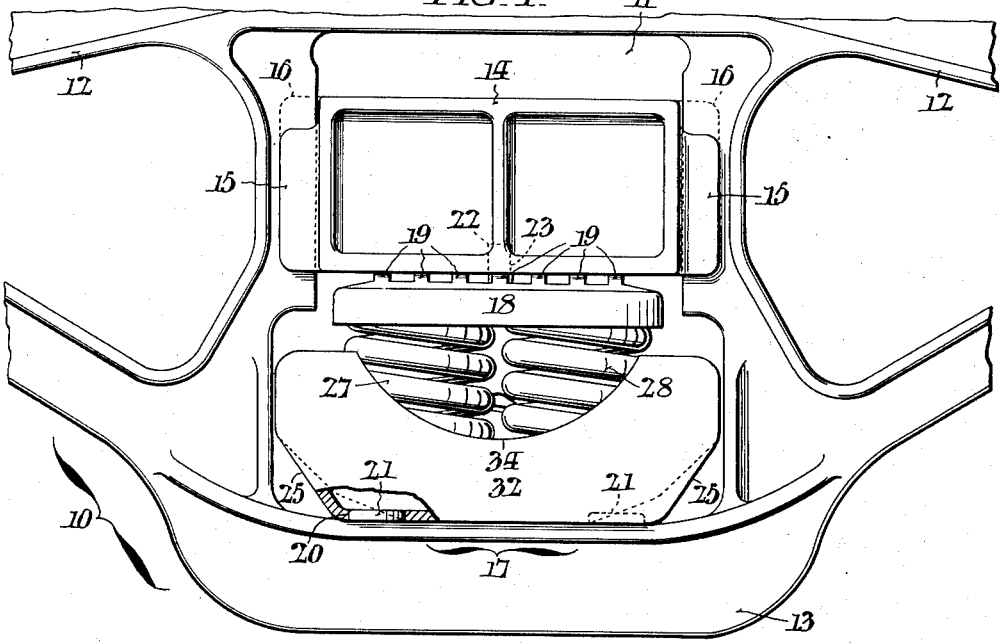
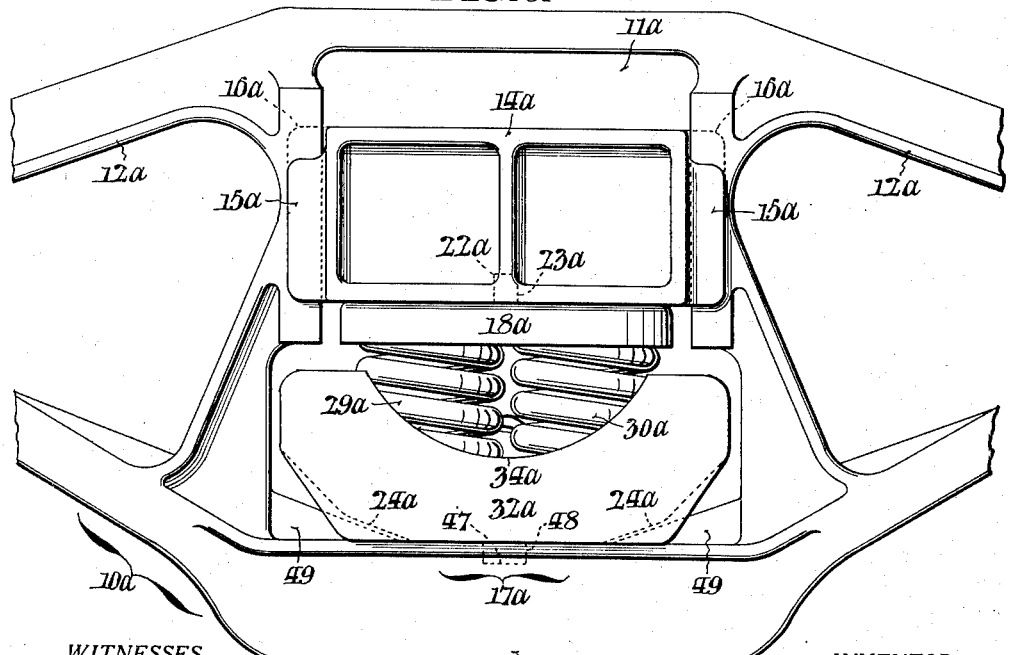
WITNESSES
INVENTOR:
Charles D. Barrett,
BY Paul & Paul
ATTORNEYS.

Oct. 7, 1952 — C. D. BARRETT — 2,613,075
BOLSTER SPRING AND SNUBBER MEANS FOR RAILWAY CAR TRUCKS
Filed April 21, 1949 — 3 Sheets-Sheet 2
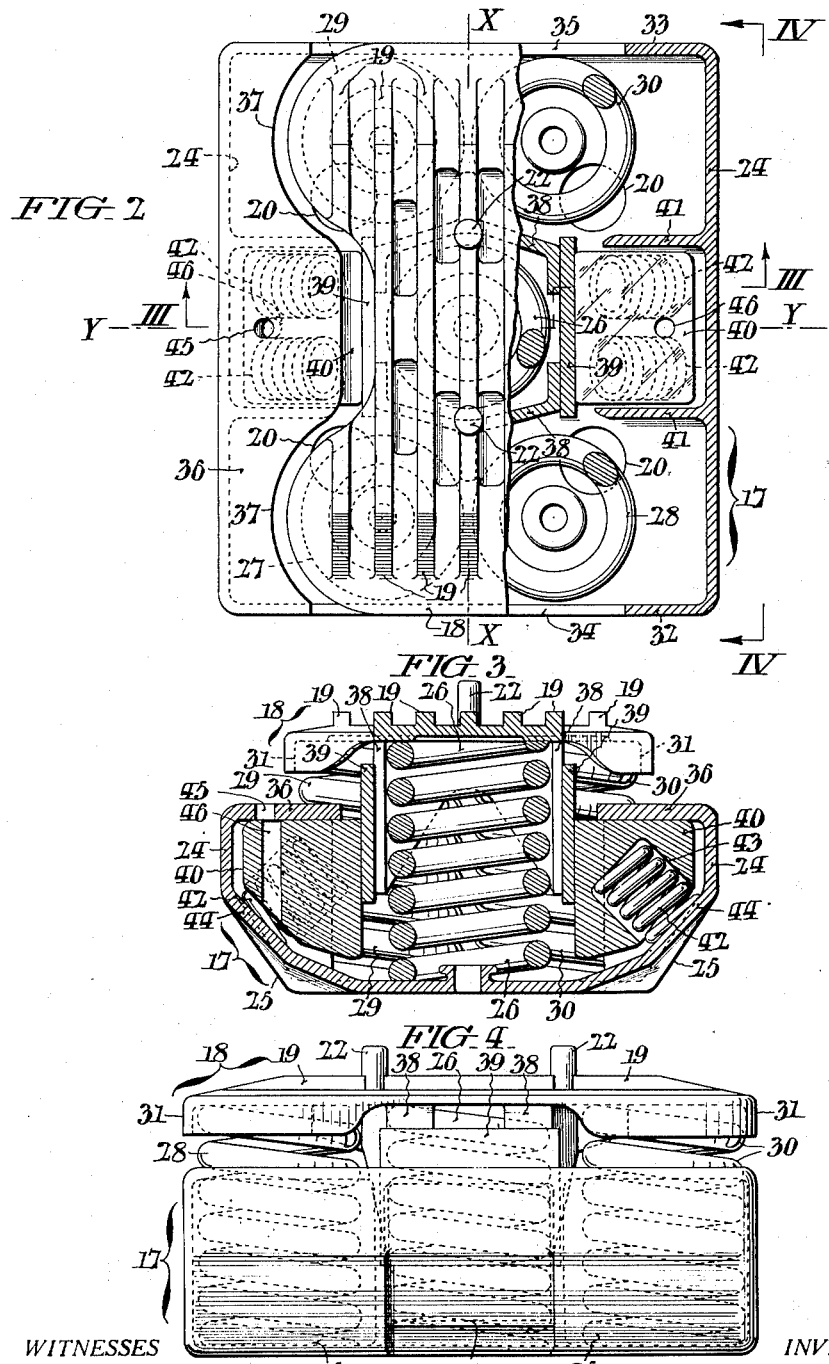
INVENTOR:
Charles D. Barrett.,
BY Paul & Paul
ATTORNEYS.
WITNESSES
Thomas W. Kerr Jr.
A. J. Brittingham Oct. 7, 1952 — C. D. BARRETT — 2,613,075
BOLSTER SPRING AND SNUBBER MEANS FOR RAILWAY CAR TRUCKS
Filed April 21, 1949 — 3 Sheets-Sheet 3
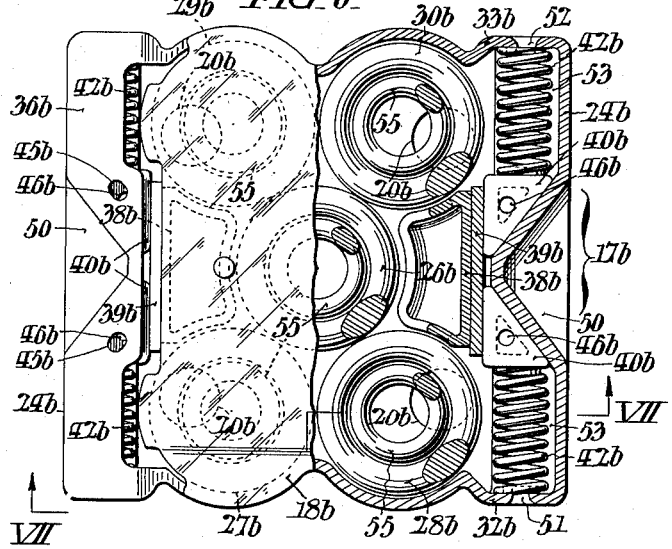
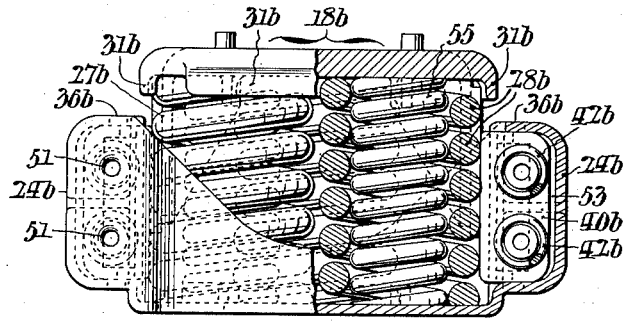
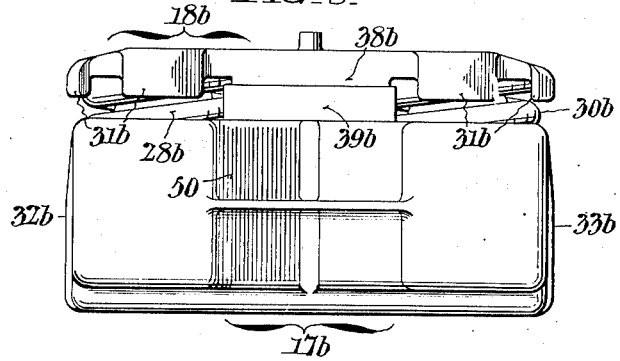
WITNESSES
INVENTOR:
Charles D. Barrett,
BY Paul & Paul
ATTORNEYS.

Patented Oct. 7, 1952

2,613,075

UNITED STATES PATENT OFFICE 2,613,075

BOLSTER SPRING AND SNUBBER MEANS FOR RAILWAY CAR TRUCKS

Charles D. Barrett, Altoona, Pa.

Application April 21, 1949, Serial No. 88,834

14 Claims. (Cl. 267—9)

This invention relates to spring and snubber means for railway car trucks intended more particularly for use in connection with freight car trucks having side frames of the so called "standard" types, as well as in connection with trucks having side frames of the "double truss" type.

There are in service on American railroads hundreds of thousands of freight car trucks which would ride as well as most of the so called modern "high speed" trucks if equipped with as flexible bolster supporting springs and snubbers. Attempts have been made heretofore to convert old trucks into high speed trucks, but in most such instances it has been necessary to provide either new bolsters and new side frames or both at great expense for attainment of the desired result. Various kinds of snubbers have also been devised for the accommodation of which it was necessary, on account of the small space available in the windows of the side frames, to omit one of the usual group of five helical compression springs with consequent detraction from the cushioning effect and, in turn, from the load carrying capacity of the trucks.

The chief aim of my invention is to overcome the above mentioned drawbacks. This objective is realized in practice as hereinafter more fully disclosed, through provision of a simple and relatively inexpensive spring and snubber means in the form of a compact unit which is composed of parts capable of being pre-assembled; which is readily accommodated in the lower or wider portion of the window either of a standard side frame or the window of a side frame of the double truss type, beneath the bolster end; which allows the use of the full complement of springs; and which, moreover, does not entail any changes whatever either in the side frames or in the bolsters.

Other objects and attendant advantages will appear from the following detailed description of the attached drawings, wherein:

Fig. 1 is a fragmentary view, in side elevation, of a freight car truck with a standard side frame, and with a bolster spring and snubber unit or package conveniently embodying my invention.

Fig. 2 is a view showing the unit partly in top plan and partly in horizontal section.

Fig. 3 is a longitudinal section of the unit taken as indicated by the angled arrows III—III in Fig. 2.

Fig. 4 is a view in end elevation looking as indicated by the angled arrows IV—IV in Fig. 2.

Fig. 5 is a view in side elevation like Fig. 1, but of a truck with a side frame of the double truss type equipped with a bolster spring and snubber unit of my invention.

Figs. 6, 7 and 8 are views generally like Figs. 2, 3 and 4 of an alternative embodiment of my invention.

With more detailed reference, first more particularly to Figs. 1-4 of these illustrations, the numeral 10 comprehensively designates a standard side frame such as is ordinarily used on railway freight car trucks, having a bolster window 11 centrally between its longitudinal compression and tension members 12 and 13. The upper portion of the window 11 is of a width to receive the end of the bolster 14 rather snugly, and the side edges thereof serve, in cooperation with lateral lug projections 15 and 16 on the bolster, to hold the latter assembled with the side frame while allowing relative vertical movement between the two as and for a purpose well understood. The lower portion of the window 11 is somewhat wider than the upper part to permit introduction thereinto of the end of the bolster in assembling the truck parts likewise in a manner well understood.

The spring and snubber means with which the present invention is more especially concerned comprises a box-like element or spring housing 17 which is dimensioned to fit into and substantially fill the lower portion of the window opening 11 in the side frame 10, and a plate-like cover element 18 which is slightly narrower than the upper portion of said window opening 11 so as to be movable up and down within it, said cover element, in this instance, being provided on its top surface with ribs 19. The box-like element 17 is provided in its bottom with four apertures 20 arranged to engage the usual upstanding stud projections 21 on the bottom of the window opening, and the pad 18 has transversely arranged upstanding studs 22 to engage into the two usual apertures 23 in the bottom of the bolster end. For a purpose later on explained, the side walls 24 of the box-like element 17 are complementally beveled at the bottom, as at 25.

Housed within the box-like element 17 is a group of five upright helical springs 26, 27, 28, 29 and 30 whereof one is centrally located, and whereof the outer ones are more closely spaced relative to the transverse axis X—X of the window than to the longitudinal axis Y—Y as best seen in Fig. 2. The plate-like element 18 is directly supported by the springs 26—30 and in turn serves as a pad upon which the corresponding end of the bolster is rested. From Fig. 1 it will be observed that the width of the pad 18 is somewhat less than that of the upper portion of the window so as to be movable up and down within the latter and, from Fig. 2, that it is so configured in plan as to correspond roughly in shape to the area occupied by the spring group 26—30. It is to be further noted that the pad 18 is provided with arcuate flanges at 31 to overhang the upper ends of the four outer springs 27—30 and so assists in preventing displacement of said springs in the assemblage. The top edges of the front and rear end walls 32 and 33 of the spring housing 17 are recessed downwardly as at 34 and 35 in Figs. 1 and 2, and the top wall 36 is formed with an opening 37 which approximates the shape of the pad 18 so that the latter will clear in the event that the springs become "solid" when the bolster 14 is heavily loaded.

Pendent from the pad 18 immediately to the front and rear of the central spring 26 are two web projections 38 of obtuse angular cross section; and welded or otherwise secured crosswise of opposite side edges of said projections are hardened wear plates 39 for engagement by the inner vertical faces of snubber shoes 40. As shown in Fig. 2, the shoes 40 are confined to guideways in the central longitudinal axis Y—Y of the window 11 between spaced webs 41 which extend inwardly from the opposite side walls 24 of the spring housing 17. The shoes 40 are biased inwardly and upwardly by compression springs 42 so as to be maintained in effective frictional contact, not only with the vertical faces of the wear plates 39, but also with the horizontal bottom faces of the upper wall portions 36 of the spring housing 17 as shown to the best advantage in Fig. 3. The springs 42 are disposed in diagonal recesses 43 in the shoes 40, with their outer ends abutting sloped indentations 44 of the side walls 24 of the spring housing 17.

Referring again to Figs. 2 and 3, the top wall portions 36 of the spring housing 17 and the friction shoes 40 are provided with holes 45 and 46 respectively. In assembling the parts, the shoes 40 are forced laterally outward in opposition to the pressure of the springs 42 until the holes 46 in them register with the holes 45 in the top wall of the spring housing 17, whereupon pins (not shown) are inserted to hold said shoes temporarily retracted to permit placement of the pad 18, this being done, of course, after insertion of the cushioning springs 26—30. With the foregoing accomplished, the pins just referred to are withdrawn to release the shoes into engagement with the wear plates 39 on the pendant projections 38 on the pad 18. The completed unit thus formed is introduced into the window opening of the side frame 10 beneath the end of the bolster 14 while the latter is temporarily held raised and before the car body (not illustrated) is superimposed. After the unit is properly positioned in the side frame with the holes 20 in the element 17 engaged over the studs 21 at the bottom of the window, the bolster 14 is lowered onto the pad 18 incident to which the holes 23 in the bottom of its end are engaged with the stud projections 22 on said pad. It is of course to be understood that a similar unit is provided for and inserted into the window opening in the opposite side frame (not illustrated) of the truck to yieldingly support the other end of the bolster. It will be seen that the springs 42 keep the shoes 40 in pressure contact with both the spring housing 17 and the pad 18 and are therefore maintained in proper alignment, as a result of which the bolster is, in turn, maintained in proper alignment with the side frame 10 of the truck and the latter prevented from getting out of square.

For use of my improved spring and buffer means with a side frame 10a of the double truss type shown in Fig. 5, the pad 17a is provided at the bottom with stud projections 47 for engaging into the usual pre-allocated holes 48 in the central portion of the tension member 13a at the window opening 11a. In this instance, the pad 18a is made without top ribs. In all other respects the unit of Fig. 5 is identical with the one hereinbefore described in detail, and hence, in order to preclude the necessity for repetitive description, all other parts not specifically referred to are here identified by the reference numerals previously used with addition in each instance, of the letter "a" for convenience of better distinction. In this connection it is to be noted that the portions of the reinforcing ribs 49 of the side frame at the bottom of the window opening are cleared as a consequence of the beveling of the side walls of the spring housing 17a at 24a.

In the alternative embodiment of my invention illustrated in Figs. 6–8, the snubbing is effected by shoes 40b which are arranged in pairs within the housing element 17b at opposite sides of the cushioning spring group 26b–30b, and which are subject to compression springs 42b. As shown in Fig. 6, the shoes 40b are triangular in cross section and engage, wedge fashion, between the outer faces of wear plates 39b attached to the pendant web projections 38b of the pad 18b, and surfaces afforded by angular indentations 50 centrally of opposite side walls 24b of the spring housing 17b. The springs 42b are held against displacement through engagement of their opposite ends over boss projections 51 and 52 respectively on the front and rear end walls 32b and 33b of the spring housing 17b and on the backs of the shoes 40b which, see Fig. 7, are confined in guide pockets 53 formed in the end walls 24b of said housing. Here, as in the first described embodiment, the top wall portions 36b of the spring housing 17b are provided with holes 45b and the friction shoes 40b with holes 46b so that pins may be used, as before, to hold said shoes temporarily retracted until the unit is completely assembled. A variation will be here noted in that a smaller helical spring 55 is shown within each of the springs 26b, 27b, 28b, 29b and 30b for increase of the cushioning effect. Such additional springs may of course be employed, if desired in the embodiment shown respectively in Figs. 1–4 and 5–8.

Having thus described my invention, I claim:

1. Bolster spring and snubber means in the form of a pre-assembled unit for use with a standard railway car truck side frame having a window opening whereof the upper portion serves as a vertical guideway for the corresponding end of the bolster, and whereof the lower portion is wider to clear the bolster end incident to assembling, said unit comprising a box-like element of a width to substantially fill the lower portion of the window in the side frame, a pad of a width somewhat less than that of the upper guide portion of said window upon which the bolster end is rested, a group of five upright helical springs arranged transversely of the window opening in closely spaced relation with a center spring between pairs of inner and outer springs, and snubber means within the hollow of the box-like element positioned at opposite sides of the center spring, to cooperate with the pad in controlling the action of the springs.

2. Bolster spring and snubber means in the form of a pre-assembled unit for use with a standard railway car truck side frame having a window opening whereof the upper portion serves as a vertical guideway for the corresponding end of the bolster, and whereof the lower portion is wider to clear the bolster end incident to assembling, said unit comprising a box-like element of a width to substantially fill the lower portion of the window in the side frame, a pad of a width somewhat less than that of the upper guide portion of said window upon which the bolster end is rested, a plurality of upright helical springs arranged transversely of the window opening in closely spaced relation, with a center spring between other springs of said plural group; and snubber means within the hollow of the box-like element positioned at opposite sides of the center spring to cooperate with the pad in controlling the action of the springs.

3. Bolster spring and snubber means for a railway car truck having a side frame with a window whereof the upper portion serves as a vertical guideway for the corresponding end of the bolster, and whereof the lower portion is somewhat wider to clear the bolster incident to assembling, said means comprising a box-like element dimensioned to substantially fill the lower portion of the window in the side frame; a pad of a width somewhat less than that of the upper guide portion of the window on which the bolster end is rested and having a hollow open-bottomed pendent projection extending part way down into the box-like element; a group of upright helical compression springs housed within the box-like element including a center spring cleared by the pendent projection on the pad; and snubber means positioned within the box-like element at opposite sides including friction shoes to cooperate with the pendent projections of the pad in controlling the action of the helical springs, and springs between the shoes and the box-like element for maintaining the shoes in engagement with said projection.

4. Bolster spring and snubber means for a railway car truck having a side frame with a window whereof the upper portions serves as a vertical guideway for the corresponding end of the bolster, and whereof the lower portion is somewhat wider to clear the bolster incident to assembling, said means comprising a box-like element dimensioned to substantially fill the lower portion of the window in the side frame; a pad of a width somewhat less than that of the upper guide portion of the window on which the bolster is rested and having a hollow open-bottomed pendent projection extending part way down into the box-like element; a group of upright helical compression springs housed within the box-like element including a center spring cleared by the pendent projection on the pad; and snubber means including friction shoes constrained to lateral movement within the box-like element, and angularly-arranged springs buttressed against the end walls of the box-like element and said shoes and operative to maintain the shoes in frictional contact respectively with top wall portions of said element and with the opposite sides of the pendent projection of the pad.

5. Bolster spring and snubber means in the form of a pre-assembled unit for use with a standard railway car truck side frame having a window opening whereof the upper portion serves as a vertical guideway for the corresponding end of the bolster, and whereof the lower portion is wider to clear the bolster end incident to assembling, said means comprising a pad of a width somewhat less than that of the upper guide portion of the frame window upon which the bolster end is supported; a hollow box-like element resting on the bottom of the frame window with recesses interiorly thereof at opposite sides and projecting into the offsets in the lower portion of the window of the side frame; a group of springs within the hollow of the box-like element including a center spring positioned between the offsets; and snubber means disposed in the lateral recesses of the element to cooperate with a projection on the pad extending down through an opening in the top of said element in controlling the action of the springs.

6. Railway car truck bolster spring and snubber means according to claim 5, wherein the snubber means include friction shoes, and springs between the shoes and said box-like element for maintaining the shoes in frictional engagement with the opposite sides of the pendent projection on the pad.

7. Railway car truck bolster spring and snubber means according to claim 5, wherein the snubber means comprises shoes in the form of blocks having a sliding fit in the lateral recesses of the box-like element, and snubber springs in compression respectively between the blocks and the side walls of said element.

8. Railway car truck bolster spring and snubber means according to claim 5, wherein the snubber means comprises friction shoes in the form of blocks having a sliding fit within the lateral recesses of said element, and snubber springs operative to urge the shoes upwardly and inwardly for maintenance in frictional engagement with the pendent projection of the pad and also with the top wall of said element.

9. Railway car truck bolster spring and snubber means according to claim 5, wherein the recesses are medially disposed relative to the front and rear walls of the box-like element; wherein the pendent projection of the pad is centrally located on the latter, and is hollow and open at the bottom; wherein the springs of the group are of the helical type with one disposed centrally of the element within the hollow of the pendent projection of the pad, and with others disposed within the corners of said elements.

10. Railway car truck bolster spring and snubber means according to claim 5, wherein the lower corners of the opposite sides of the box-like element are beveled to clear inclined reenforcing webs at corresponding bottom corners of the window opening in the truck frame.

11. Bolster spring and snubber means in the form of a pre-assembled unit for use with a railway car truck side frame having a window opening whereof the upper portion serves as a guideway for the corresponding end of the bolster, said unit comprising a box-like element for placement within the window of the side frame at the bottom, said element having inclined end walls and top wall portions extending inwardly from said end walls, a pad upon which the bolster end is rested, a group of upright helical springs symmetrically arranged transversely of the window opening in closely spaced relation on which the pad is supported, a pendent projection from the pad having substantially vertical walls forming friction surfaces, friction shoes within the box-like element at opposite sides, and inclined helical springs resting on the inclined walls of said element and engaging said shoes for urging the latter upwardly and inwardly into frictional engagement with the pendent projection on the pad and with the top wall portions of said element.

12. Bolster spring and snubber means for a railway car truck having a side frame with a window opening whereof the upper portion serves as a vertical guideway for the corresponding end of the bolster, and whereof the lower portion is somewhat wider for clearance of the bolster end incident to assembling, said means comprising a pad on which the bolster end is rested; a bottom member adapted to be supported on the bottom of the window opening and having upstanding side portions extending into the side offsets of the lower portion of the window opening; a group of vertical axis helical springs in compression between the pad and the member including a center spring; pendent projections on the pad reaching downwardly part way of opposite sides of the center spring; friction shoe elements guided for lateral movement within the recesses in the upstanding portions of the bottom member and contacting the pendent projections on the pad; and snubber springs between the shoe elements and the bottom member for maintaining the shoe elements frictional engagement with said projections.

13. Bolster spring and snubber means according to claim 12, wherein the snubber springs urge the shoe elements inwardly and upwardly for maintenance in frictional engagement with the pendent projections on the pad.

14. Bolster spring and snubber means in the form of a preassembled unit for use with a railway car truck side frame having a window opening whereof the upper portion serves as a guideway for the corresponding end of the bolster, said unit comprising the box-like element for placement within the window of the side frame at the bottom having upstanding wall portions at opposite sides forming recesses to house friction means, a pad upon which the bolster end is rested and having a pendent projection extending part way down into the box-like element, a group of upright helical springs housed within the box-like element on which the pad is supported, and friction means comprising friction shoes and angularly-arranged springs buttressed against the shoes and the walls of the box-like element and operative to maintain said shoes in frictional engagement with the tops of the recesses in the side wall portions of the box-like element and with the pendent projection on the pad.

CHARLES D. BARRETT.

REFERENCES CITED

The following references are of record in the file of this patent:

UNITED STATES PATENTS

| Number | Name | Date |
|---|---|---|
| 2,118,006 | Couch | May 17, 1938 |
| 2,357,264 | Light | Aug. 29, 1944 |
| 2,390,110 | Light | Dec. 4, 1945 |
| 2,395,967 | Haseltine | Mar. 5, 1946 |
| 2,441,620 | Dath | May 18, 1948 |
| 2,446,506 | Barrett et al. | Aug. 3, 1948 |
| 2,472,035 | Williams | May 31, 1949 |
| 2,483,181 | Clasen | Sept. 27, 1949 |